(12) United States Patent
Davis et al.

(10) Patent No.: US 8,356,124 B1
(45) Date of Patent: Jan. 15, 2013

(54) METHOD AND SYSTEM FOR PROCESSING PACKET TRANSFERS

(75) Inventors: Almir Davis, Quincy, MA (US);
Michael Sgrosso, Franklin, MA (US);
William F. Baxter, III, Holliston, MA (US); Avinash Kallat, Malborough, MA (US)

(73) Assignee: EMC Corporation, Hopkinton, MA (US)

( * ) Notice: Subject to any disclaimer, the term of this patent is extended or adjusted under 35 U.S.C. 154(b) by 2424 days.

(21) Appl. No.: 10/846,386

(22) Filed: May 14, 2004

(51) Int. Cl.
*G06F 3/00* (2006.01)
*G06F 5/00* (2006.01)
*G06F 13/368* (2006.01)
*G06F 13/14* (2006.01)
*H04L 12/40* (2006.01)

(52) U.S. Cl. ............... 710/20; 710/33; 710/58; 710/61; 710/119; 710/305; 370/438

(58) Field of Classification Search .................. None
See application file for complete search history.

(56) References Cited

U.S. PATENT DOCUMENTS

| | | | |
|---|---|---|---|
| 6,347,351 B1 * | 2/2002 | Osborne et al. | 710/119 |
| 6,438,634 B1 * | 8/2002 | Watanabe et al. | 710/110 |
| 6,510,474 B1 * | 1/2003 | Stracovsky et al. | 710/58 |
| 6,526,484 B1 * | 2/2003 | Stacovsky et al. | 711/158 |
| 6,622,194 B1 * | 9/2003 | Lee | 710/305 |
| 7,133,967 B2 * | 11/2006 | Fujie et al. | 711/114 |
| 2004/0225781 A1 * | 11/2004 | Kotlowski et al. | 710/200 |
| 2005/0120163 A1 * | 6/2005 | Chou et al. | 711/103 |
| 2005/0138260 A1 * | 6/2005 | Love | 710/306 |

* cited by examiner

*Primary Examiner* — Chun-Kuan Lee
*Assistant Examiner* — Henry Yu
(74) *Attorney, Agent, or Firm* — Krishnendu Gupta; R. Kevin Perkins

(57) ABSTRACT

A data transfer system includes a PCI Express transaction layer having an input for serially receiving posted and non-posted request packets and completion packets; an application layer coupled to the PCI Express transaction layer for receiving posted and non-posted request packets and completion packets from the PCI Express transaction layer; a first transmission interface coupling the application layer to the PCI Express transaction layer; and a second transmission interface coupling the application layer to the PCI Express transaction layer. The PCI Express transaction layer transmits posted and non-posted request packets to the application layer over the first transmission interface and transmits completion packets to the application layer over the second transmission interface.

23 Claims, 4 Drawing Sheets

METHOD AND SYSTEM FOR PROCESSING PACKET TRANSFERS

FIELD OF THE INVENTION

The present invention is directed generally to a method and system for processing packet transfers and more particularly to a method and system for separately transmitting request packets and completion packets associated with the transaction layer of a PCI Express core to an associated application layer.

BACKGROUND OF THE INVENTION

PCI Express is the next generation of PCI (Peripheral Component Interconnect), which is a standard interconnection system that enables the transfer of data between a host device 112 and an attached application layer device 114 of a data transfer system 100, FIG. 1. The PCI Express protocol is implemented using PCI Express core 116. PCI Express core 116 is a hardware controller used to identify and resolve the PCI Express protocol layers: the physical/mac layer 118, the link layer 120 and the transaction layer 122. The data is delivered through an application layer interface 124 to the attached application layer device 114.

PCI Express protocol is a very fast, bandwidth rich protocol, enabling a variety of applications to be implemented through a PCI Express link. Application layer devices 114 can include bandwidth-consuming applications, such as file transfers and multimedia files, latency-sensitive applications, such as real-time video and voice streaming applications, and applications requiring both high bandwidth and low latency, such as video conferencing.

The application layer interface 124 connects the PCI Express core 116 to the application layer device 114. The application layer device 114 may be a single, common address/data bus having a few control signals to insure errorless handshakes between the host 114 and any type of application. For example, the application layer device may be a switch or router connected between the PCI Express core 116 and a number of clients that communicate with the host 112. The application layer device in such a case routes incoming packets to the appropriate client. The application layer interface 124 is driven by the transaction layer architecture 122 of the PCI Express core 116. The transaction layer architecture 122 of the PCI Express core 116 typically consists of six FIFO buffers: a non-posted header buffer "NP H" 126, a non-posted data buffer "NP D" 128, a posted header buffer "P H" 130, a posted data buffer "D" 132, a completion header buffer "C H" 134 and a completion data buffer. "C D" 136. The six buffers 126-136 are needed to implement the PCI Express reordering rules for three different types of transfers: 1) posted transfers (typically memory write transfers); 2) non-posted transfers (typically memory read transfers); and 3) completion transfers (also called "read response" transfers). The PCI Express reordering rules are set by the PCI Express Standard and described in the PCI Express Base Specification.

However, the reordering of transfers is an area where the most bandwidth is lost and latency increased during the processing of transfers. Typically, data is sent through a single output queue 138 of the host device 112 to a single input queue 140 of the receiving PCI Express core 116 over PCI Express link 142. From the single input queue 140, the data is then distributed to the six transaction layer FIFOs 126-136, depending upon the transfer type of the packet (posted, non-posted, or completion). An arbiter 137 then offloads the transfers from the FIFOs 126-136, in an order dictated by the PCI Express reordering rules and transmits the transfers through the application layer interface 124 to the application layer 114.

The reordering rules are designed to favor the transmission of completion packets before posted and non-posted packets, because completion packets carry data earlier requested by the application layer 114, through the application layer interface 144 of the application layer 114. This means that the transmission of packets to the application layer 114 acting as the master in the system are preferred to the packets where application layer 114 is a slave. This is illustrated in the following example.

As shown in FIG. 2, host device 112 transmits the packet sequence 150: C1 (completion packet 1), P1 (posted packet 1), C2 (completion packet 2), . . . , Cn (completion packet n) from the output queue 138 to the input queue 140 through the PCI Express link 142. The PCI Express link 142 delivers the packets to the input queue 140 in the same order that they were stored in the output queue 138. The input queue 140 propagates the packets into FIFO reordering buffers 126-136 at the transaction layer 122 of the PCI Express core 116. The packets are reordered according to the reordering rules specific to the PCI Express standard, and the sequence arrives at the application layer interface 124 in the order: C1, C2, . . . , Cn, P1. As shown, because of the reordering rules implemented by the arbiter 127, the posted request packet P1 is transmitted after all the completion packets C1, C2, . . . , Cn are transmitted.

If the data carried by the posted packet P1 is latency-sensitive data, which it typically is in most applications, since posted and non-posted requests are usually data write requests and data read requests to the application, the PCI Express core 116 has failed to provide the "Quality of Service," in terms of latency, required for the posted packet P1. Even worse, if the completion packets (C1, C2, . . . , Cn) have a large data payload, which is usually the case in order to increase the efficiency of the PCI Express link 142, the posted packet P1 latency might be unacceptable for the most applications.

SUMMARY OF THE INVENTION

The present invention is directed to a data packet transfer system including an application layer interface having a first interface for transmitting posted and non-posted request packets to the application layer from the PCI Express core and a second interface for transmitting completion packets to the application layer from the PCI Express core.

According to one embodiment, a data transfer system includes a transfer controller having an input for serially receiving request packets and completion packets; a transfer receiving device coupled to the transfer controller for receiving request packets and completion packets from the transfer controller; a first transmission interface coupling the transfer receiving device to the transfer controller; and a second transmission interface coupling the transfer receiving device to the transfer controller. The controller transmits request packets to the transfer receiving device over the first transmission interface and transmits completion packets to the transfer receiving device over the second transmission interface.

The transfer receiving device may include an application layer. The request packets may include posted request packets and non-posted request packets. The transfer controller may include an arbiter for reordering the posted and non-posted request packets received by the transfer controller for transmission over the first transmission interface to the transfer receiving device. The transfer controller may enable the transmission of the request packets and completion packets to the transfer receiving device contemporaneously.

According to another embodiment, a data transfer system includes a PCI Express transaction layer having an input for serially receiving posted and non-posted request packets and completion packets; an application layer coupled to the PCI Express transaction layer for receiving posted and non-posted request packets and completion packets from the PCI Express transaction layer; a first transmission interface coupling the application layer to the PCI Express transaction layer; and a second transmission interface coupling the application layer to the PCI Express transaction layer. The PCI Express transaction layer transmits posted and non-posted request packets to the application layer over the first transmission interface and transmits completion packets to the application layer over the second transmission interface.

The PCI Express transaction layer may include an arbiter for reordering the posted and non-posted request packets received by the PCI Express transaction layer for transmission over the first transmission interface to the transfer receiving device. The PCI Express transaction layer may enable the transmission of the posted and non-posted request packets and completion packets to the application layer contemporaneously.

According to another embodiment, a data transfer method includes:
A. serially receiving request packets and completion packets;
B. inputting the request packets into a first register device;
C. inputting the completion packets into a second register device;
D. transmitting the request packets to a packet receiving device through a first interface; and
E. transmitting the completion packets to the packet receiving device through a second interface.

According to yet another embodiment, a data transfer method includes:
A. serially receiving request packets and completion packets in a PCI Express transaction layer;
B. inputting the request packets into a first register device;
C. inputting the completion packets into a second register device;
D. transmitting the request packets to an application layer device through a first interface; and
E. transmitting the completion packets to the application layer device through a second interface.

BRIEF DESCRIPTION OF THE DRAWINGS

These and other features of the invention will become more readily apparent from the following detailed description when read together with the accompanying drawings, in which.

DETAILED DESCRIPTION

The present invention solves the low bandwidth/high latency problem described above by including an application layer interface having a first interface for transmitting posted and non-posted request packets to the application layer from the PCI Express core and a second interface for transmitting completion packets to the application layer from the PCI Express core. This enables the posted and non-posted request packets to be transmitted to the application layer independently of the completion packets, resulting in an increase in the bandwidth of the overall application layer interface and a decrease in the latency of latency-sensitive posted and non-posted request packets.

Figure 1:
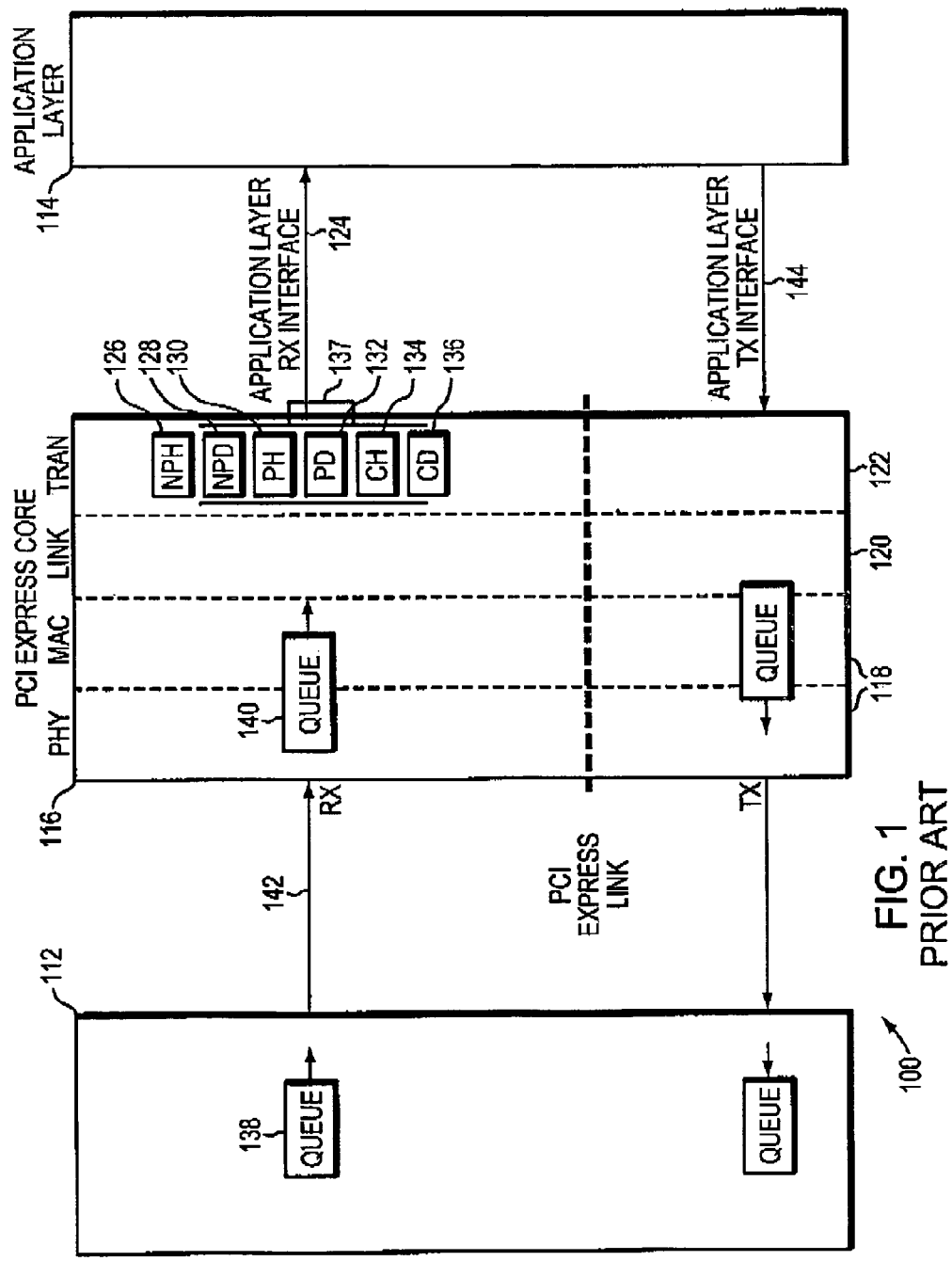
FIG. 1 is a schematic diagram of a prior art PCI Express data transfer system.
Figure 2:
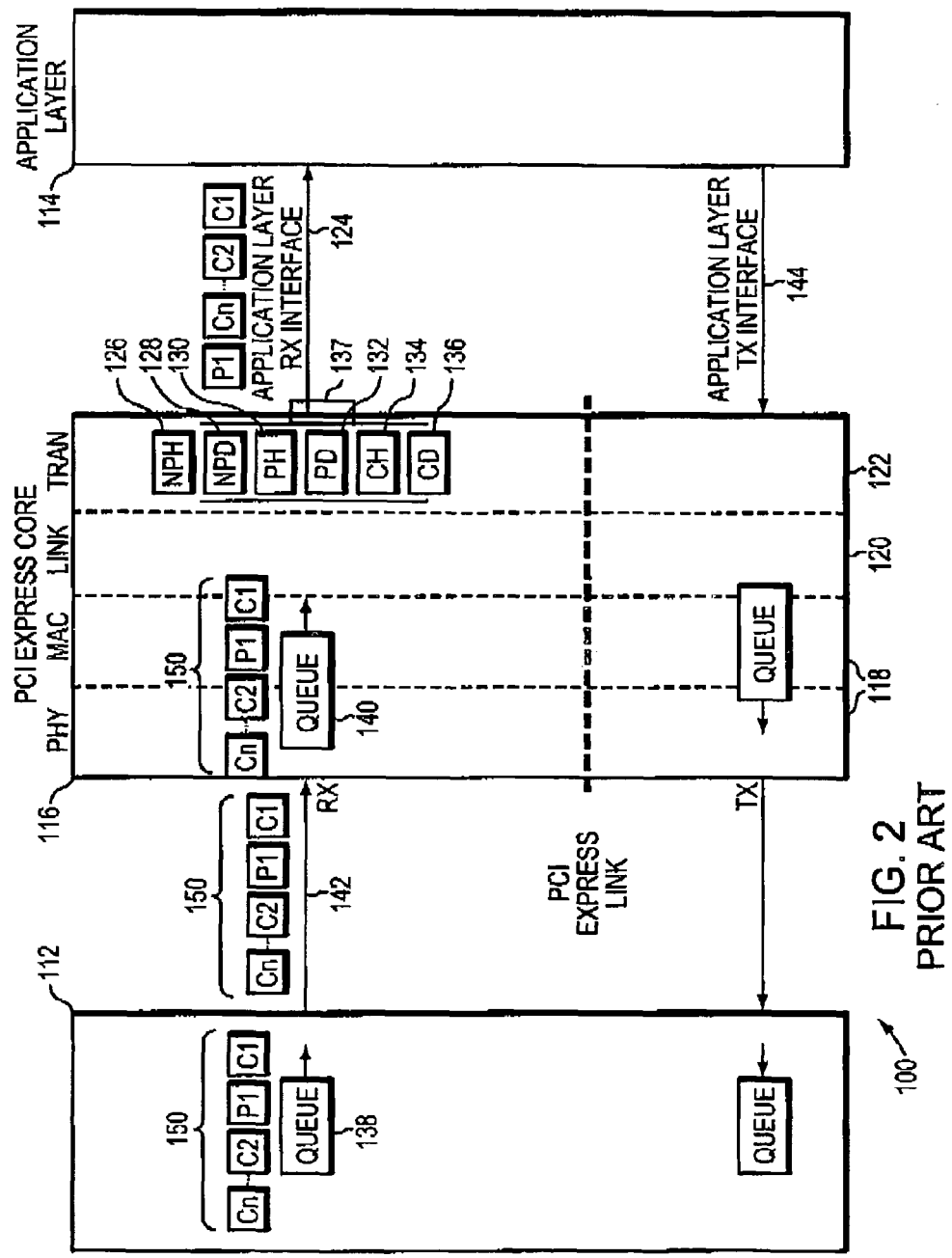
FIG. 2 is a schematic diagram of a prior art PCI Express data transfer system showing how a sequence of packets received by the PCI Express core are transmitted to the application layer device.
Figure 3:
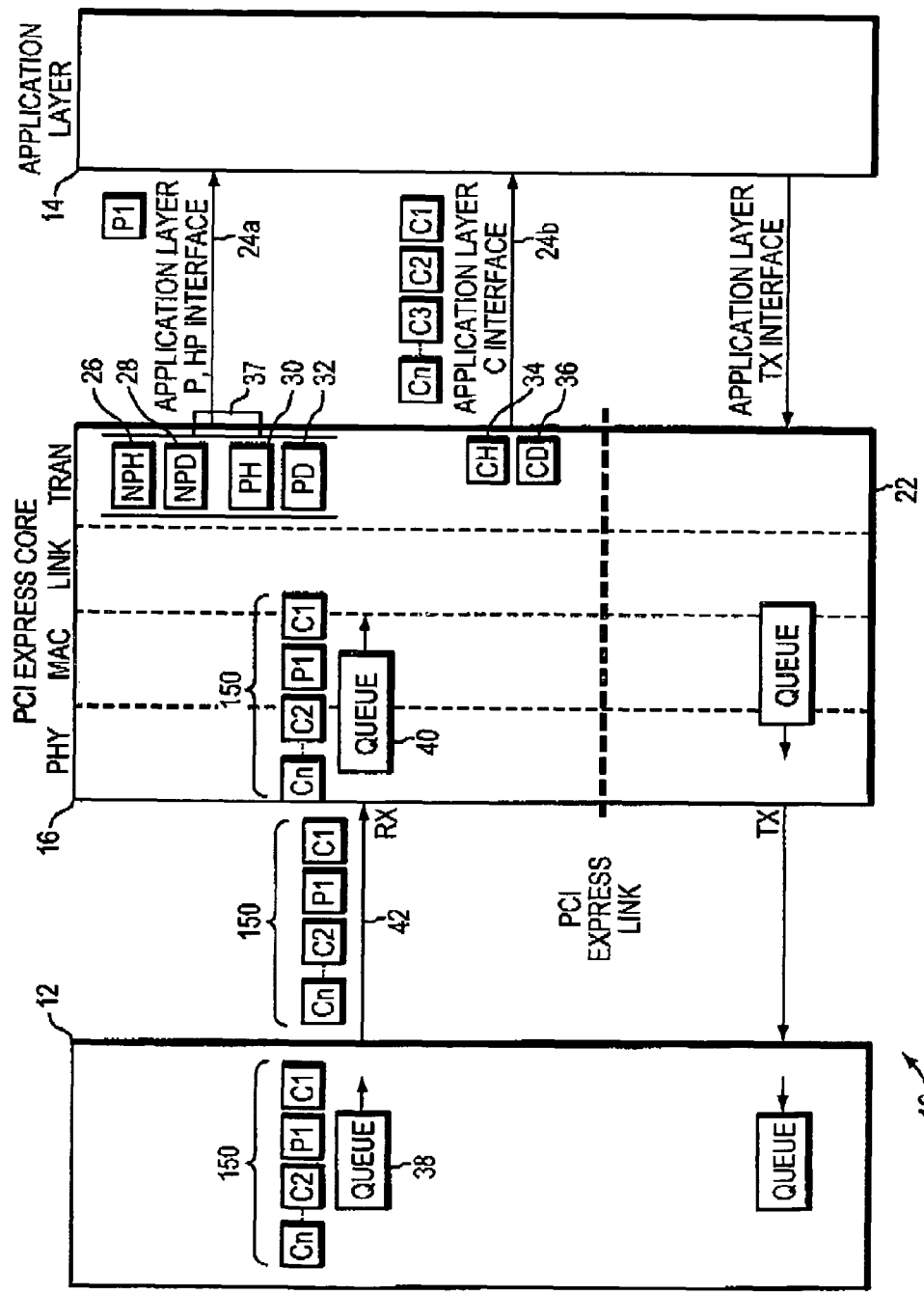
FIG. 3 is a schematic diagram of the data transfer system according to the present invention.
Figure 4:
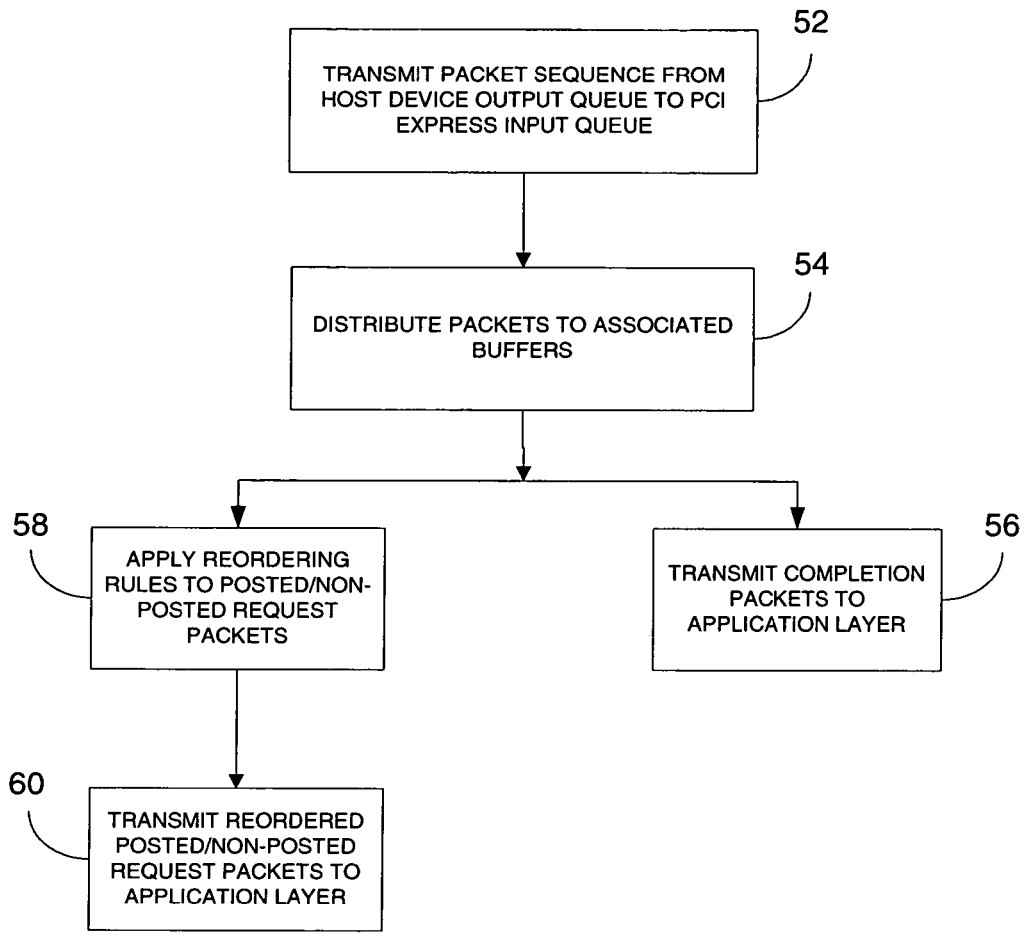
FIG. 4 is a flow diagram showing the steps involved in the operation of the data transfer system of FIG. 3.

As shown in FIG. 3, which is a schematic diagram of the data transfer system 10 of the present invention, AND FIG. 4, which is a flow diagram showing the step involved in the operation of the system 10, the same packet sequence 150: C1, P1, C2, . . . Cn is transmitted from the output queue 38 of the host device 12, across the PCI Express link 42 to into the input queue 40 of the PCI Express core 16, Step 52. Each packet of the sequence is then input to its respective transaction layer buffer 26-36, depending on the type of packet that it is, as described above, Step 54.

In accordance with the invention, the transaction layer 22 includes an arbiter 37 that only handles the posted and non-posted request packets. The posted and non-posted request packets are reordered according to the PCI Express Standard, Step 58, and are then transmitted to the application layer device 14 over application layer interface 24a, Step 60. The completion packets are not arbitrated and are directly transmitted from the buffers 34, 36 to the application layer device 14 over the application layer interface 24b, Step 56. As shown in FIG. 3, after each packet of the sequence 150 is input to its respective transaction layer buffer 26-36, the completion packets C1, C2, . . . , Cn are directly transmitted to the application layer device 14 over application layer interface 24b without arbitration, and the posted request packet P1 is transmitted to the application layer device 14 over application layer interface 24a after arbitration in arbiter 37. Since the posted packet P1 is not reordered behind the completion packets C1, C2, . . . , Cn, it can be relatively contemporaneously transmitted to the application layer 14 with the completion packets.

Arbitrating only the posted and non-posted request packets requires a much less complex arbiter than in the prior art, which results in a smaller arbitration logic gate count inside the PCI Express Core and decreased arbitration latency. For example, in the prior art system, because three different types of packets must be reordered, the arbiter 137 must resolve 9 possible combinations of packets when reordering the packets. The arbiter 137 of the prior art system required up to 3 clock cycles to address all 9 possible combinations. In the present invention, since only two types of packets are reordered by the arbiter, the arbiter 37 only needs to address 4 possible combinations of packets when reordering. The arbiter 37 is able to address the four possible combinations of packets in approximately one clock cycle. This represents a reduction of the arbitration latency by two-thirds.

Furthermore, the latency of the posted request packet P1 is significantly decreased as the posted request packet P1 does not have to wait for all completion packets to be transmitted. For example, in the prior art system, if a maximum of eight 4 KB completion packets are able to be serially transmitted from the PCI Express core to the application layer, if all eight are transmitted with one posted request packet, the posted request packet, after the sequence is reordered, will be transmitted to the application layer after all of the seven completion packets. If data is transmitted at 8 bytes per clock, which is usually the case in PCI Express Core architectures, the posted request packet will be held for at least 4,096 clocks before being transmitted. In the system 10, the posted request packet P1 is transmitted relatively contemporaneously with completion packet C1.

By transferring the posted/non-posted request packets and completion packets in parallel over the application layer interfaces 24a, 24b, the throughput is greatly enhanced, and potentially doubled, and the overall system bandwidth is increased.

An additional advantage of the invention is that it increases the bandwidth and decreases the latency with only a slight modification of the arbiter in the transaction layer, and the replication of the original application layer interface. The modified arbiter, however, is simpler than in the prior art system, since it has to implement less arbitration reordering rules. The modifications required in the arbiter and the replication of application layer interface are known in the art and are not described herein.

Accordingly, by including an application layer interface having a first interface for transmitting posted and non-posted request packets to the application layer from the PCI Express core and a second interface for transmitting completion packets to the application layer from the PCI Express core, the present invention provides a decrease the latency of latency-sensitive posted and non-posted request packets; potentially doubles the application layer interface bandwidth; decreases the latency and gate count of the arbiter by employing simpler reordering arbitration logic, since fewer types of packets need reordering; requires almost no modification to the current PCI Express core design; and eliminates the potential packet bottlenecks without requiring any additional PCI Express Quality of Service feature support, such as virtual channels and traffic classes.

While the invention is described as applying to the PCI Express protocol, it will be understood that the inventive concept of including an application layer interface having a first interface for transmitting arbitrated transfer requests to the application layer from a data transfer system and a second interface for transmitting non-arbitrated transfers to the application layer from the data transfer system may be applied to any data transfer system or protocol which causes data transfers to be arbitrated in a way that decreases the overall performance of the data transfer system.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A data transfer system comprising:
a transfer controller having an input for serially receiving request packets and completion packets from an upstream device;
a transfer receiving device coupled to the transfer controller for receiving request packets and completion packets from the transfer controller;
a first interface coupling the transfer receiving device to the transfer controller; and
a second interface coupling the transfer receiving device to the transfer controller;
wherein the transfer controller transmits request packets to the transfer receiving device over the first interface and transmits completion packets to the transfer receiving device over the second interface.

2. The data transfer device of claim 1 wherein the transfer receiving device comprises an application layer.

3. The data transfer system of claim 1 wherein the request packets comprise posted request packets.

4. The data transfer system of claim 1 wherein the request packets comprise non-posted request packets.

5. The data transfer system of claim 1 wherein the request packets comprise posted request packets and non-posted request packets.

6. The data transfer device of claim 5 wherein the transfer controller comprises an arbiter for reordering the posted and non-posted request packets received by the transfer controller for transmission over the first interface to the transfer receiving device.

7. The data transfer device of claim 1 wherein the transfer controller enables the transmission of the request packets and completion packets to the transfer receiving device contemporaneously.

8. A data transfer system comprising:
a PCI Express transaction layer having an input for serially receiving posted and non-posted request packets and completion packets from an upstream device;
an application layer coupled to the PCI Express transaction layer for receiving posted and non-posted request packets and completion packets from the PCI Express transaction layer;
a first transmission interface coupling the application layer to the PCI Express transaction layer; and
a second transmission interface coupling the application layer to the PCI Express transaction layer;
wherein the PCI Express transaction layer transmits posted and non-posted request packets to the application layer over the first transmission interface and transmits completion packets to the application layer over the second transmission interface.

9. The data transfer system of claim 8 wherein the PCI Express transaction layer comprises an arbiter for reordering the posted and non-posted request packets received by the PCI Express transaction layer for transmission over the first transmission interface to the application layer.

10. The data transfer device of claim 8 wherein the PCI Express transaction layer enables the transmission of the posted and non-posted request packets and completion packets to the application layer contemporaneously.

11. A data transfer method comprising:
A. serially receiving request packets and completion packets from an upstream device;
B. inputting the request packets into a first register device;
C. inputting the completion packets into a second register device;
D. transmitting the request packets to a packet receiving device through a first interface; and
E. transmitting the completion packets to the packet receiving device through a second interface.

12. The method of claim 11 wherein the packet receiving device comprises an application layer.

13. The method of claim 11 wherein the request packets comprise posted request packets.

14. The method of claim 11 wherein the request packets comprise non-posted request packets.

15. The method of claim 11 wherein the request packets comprise posted request packets and non-posted request packets.

16. The method of claim 15 further comprising reordering the posted and non-posted request packets prior to their transmission over the first interface to the packet receiving device.

17. The method of claim 16 further comprising transmitting the request packets and completion packets to the packet receiving device relatively contemporaneously.

18. A data transfer method comprising:
   A. serially receiving, from an upstream device, request packets and completion packets in a PCI Express transaction layer;
   B. inputting the request packets into a first register device;
   C. inputting the completion packets into a second register device;
   D. transmitting the request packets to an application layer device through a first interface; and
   E. transmitting the completion packets to the application layer device through a second interface.

19. The method of claim 18 wherein the request packets comprise posted request packets.

20. The method of claim 18 wherein the request packets comprise non-posted request packets.

21. The method of claim 18 wherein the request packets comprise posted request packets and non-posted request packets.

22. The method of claim 21 further comprising reordering the posted and non-posted request packets prior to their transmission over the first interface to the packet receiving device.

23. The method of claim 22 further comprising transmitting the request packets and completion packets to the packet receiving device contemporaneously.

* * * * *